US012717455B2

(12) United States Patent
Ito

(10) Patent No.: US 12,717,455 B2
(45) Date of Patent: Aug. 25, 2026

(54) METHOD CARRIED OUT BY SENSOR CONTROLLER AND SENSOR CONTROLLER

(71) Applicant: Wacom Co., Ltd., Saitama (JP)

(72) Inventor: Akira Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/195,135

(22) Filed: Apr. 30, 2025

(65) Prior Publication Data

US 2025/0362779 A1 Nov. 27, 2025

(30) Foreign Application Priority Data

May 22, 2024 (JP) ................................ 2024-083144

(51) Int. Cl.
*G06F 3/046* (2006.01)
*G06F 3/0354* (2013.01)
*G06F 3/041* (2006.01)

(52) U.S. Cl.
CPC .......... *G06F 3/046* (2013.01); *G06F 3/03545* (2013.01); *G06F 3/041661* (2019.05)

(58) Field of Classification Search
CPC .... G06F 1/1616; G06F 1/1641; G06F 1/1643; G06F 1/1652; G06F 1/1656; G06F 1/1698; G06F 1/26; G06F 1/266; G06F 1/3262; G06F 3/03545; G06F 3/038; G06F 3/0383; G06F 3/0412; G06F 3/0416; G06F 3/04162; G06F 3/04164; G06F 3/04166; G06F 3/0441; G06F 3/0442; G06F 3/0446; G06F 3/046; H01Q 1/24; H01Q 1/38; H01Q 7/06; H02J 50/12; H10K 59/40; H10K 59/873
See application file for complete search history.

(56) References Cited

U.S. PATENT DOCUMENTS

2007/0216348 A1* 9/2007 Shionoiri ................ B60L 53/12
320/107
2022/0004266 A1* 1/2022 Ito .......................... G06N 20/00
2025/0335052 A1* 10/2025 Kim ........................ G06F 1/266

FOREIGN PATENT DOCUMENTS

JP 6698386 B2 5/2020

* cited by examiner

*Primary Examiner* — Nelson M Rosario
(74) *Attorney, Agent, or Firm* — Seed Intellectual Property Law Group LLP

(57) ABSTRACT

A method is carried out by a sensor controller for detecting an electromagnetic resonance stylus using an electromagnetic resonance sensor. The method includes, upon elapse of a predetermined period after the electromagnetic resonance sensor has stopped transmitting a feeder alternating magnetic field for feeding electric power to the electromagnetic resonance stylus, transmitting, from the electromagnetic resonance sensor, a cancelling alternating magnetic field that oscillates in a phase that cancels residual resonance in the electromagnetic resonance stylus.

15 Claims, 6 Drawing Sheets

FIG.4A

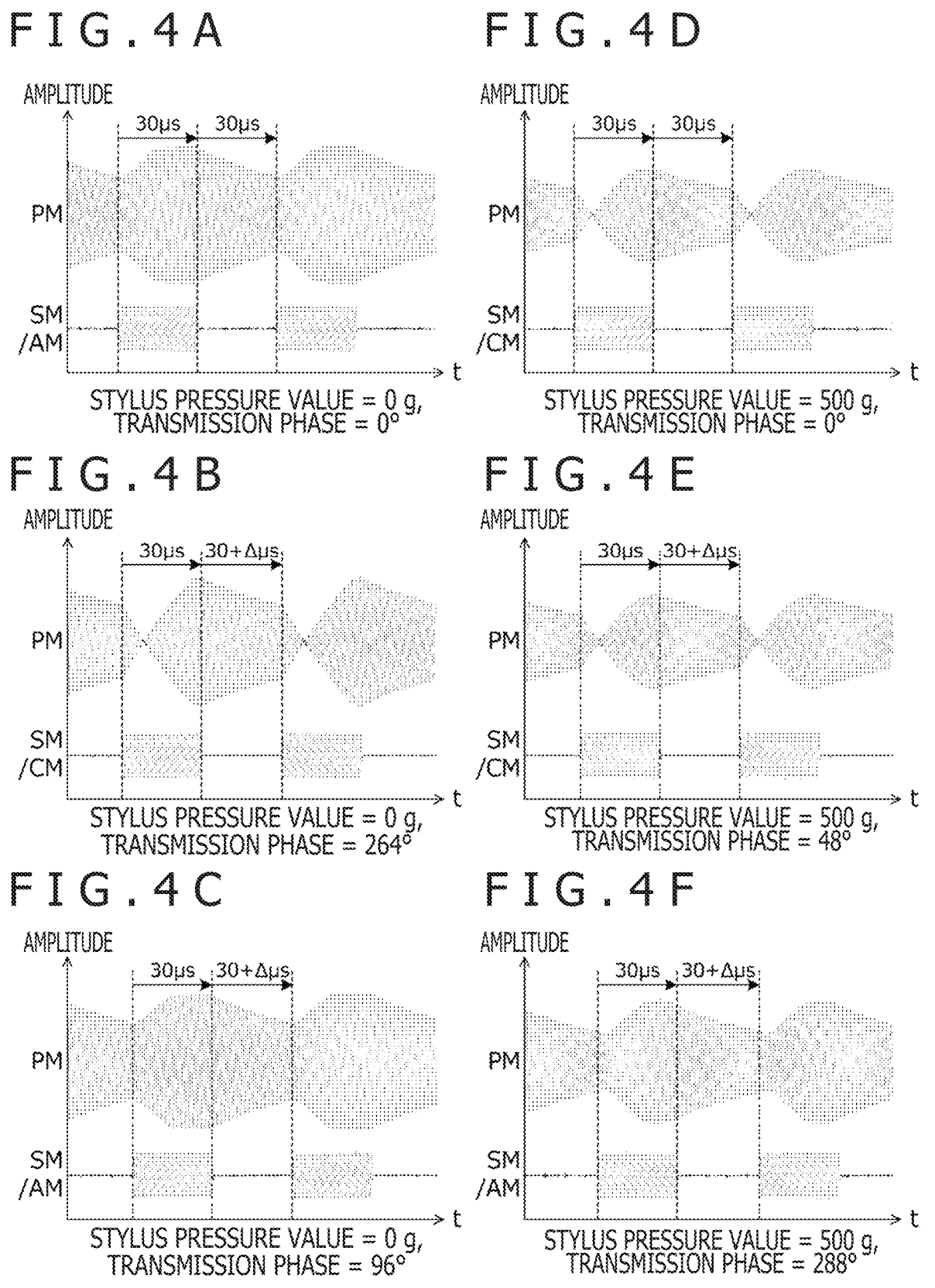

AMPLITUDE
30μs 30μs
PM
SM /AM
t

STYLUS PRESSURE VALUE = 0 g, TRANSMISSION PHASE = 0°

FIG.4B

AMPLITUDE
30μs 30+Δμs
PM
SM /CM
t

STYLUS PRESSURE VALUE = 0 g, TRANSMISSION PHASE = 264°

FIG.4C

AMPLITUDE
30μs 30+Δμs
PM
SM /AM
t

STYLUS PRESSURE VALUE = 0 g, TRANSMISSION PHASE = 96°

FIG.4D

AMPLITUDE
30μs 30μs
PM
SM /CM
t

STYLUS PRESSURE VALUE = 500 g, TRANSMISSION PHASE = 0°

FIG.4E

AMPLITUDE
30μs 30+Δμs
PM
SM /CM
t

STYLUS PRESSURE VALUE = 500 g, TRANSMISSION PHASE = 48°

FIG.4F

AMPLITUDE
30μs 30+Δμs
PM
SM /AM
t

STYLUS PRESSURE VALUE = 500 g, TRANSMISSION PHASE = 288°

METHOD CARRIED OUT BY SENSOR CONTROLLER AND SENSOR CONTROLLER

BACKGROUND

Technical Field

The present disclosure relates to a method carried out by a sensor controller and a sensor controller.

Description of the Related Art

Input units based on the electromagnetic resonance technology (EMR technology) have been known in the art as input devices for use with electronic products including tablets and smartphones. An input device of this type includes an electromagnetic resonance stylus, which is shaped like a pen, and a position detecting unit having an input surface in the shape of a flat plate. A user of the input device performs an input process by sliding the electromagnetic resonance stylus on the input surface, as if writing letters or drawing pictures on a sheet of paper. Japanese Patent No. 6698386 discloses an example of an input device according to the EMR technology.

The position detecting unit is a device for detecting the position of the electromagnetic resonance stylus on the input surface. The position detecting unit has an EMR sensor including a plurality of loop coils disposed in the input surface, and a sensor controller connected to each of the loop coils. The electromagnetic resonance stylus has a resonance circuit including a coil and a capacitor that are connected in series with each other. When the sensor controller supplies the loop coils with an alternating current, one loop coil at a time, the loop coil generates an alternating magnetic field. The alternating magnetic field is transmitted to feed electric power from the position detecting unit to the electromagnetic resonance stylus. Such alternating magnetic field is herein referred to as a “feeder alternating magnetic field.” Specifically, when the coil of the electromagnetic resonance stylus enters the feeder alternating magnetic field, the coil generates an electromotive force across the coil and the capacitor is changed. Thereafter when the sensor controller stops supplying the loop coil with the alternating current, the electric power stored in the charged capacitor causes an alternating current to flow in the resonance circuit, and the coil of the resonance circuit generates an alternating magnetic field. Such alternating magnetic field transmitted from the electromagnetic resonance stylus is herein referred to as a “stylus alternating magnetic field.” The sensor controller acquires an intensity distribution of alternating currents generated in the respective loop coils by the stylus’s alternating magnetic fields. The sensor controller derives the position of the electromagnetic resonance stylus on the input surface based on the acquired intensity distribution of the alternating currents.

According to some electromagnetic resonance stylus types, the position detecting unit is arranged to detect a stylus pressure value which is indicative of a pressure applied to the tip of the electromagnetic resonance stylus. The capacitor of the resonance circuit of the electromagnetic resonance stylus is connected in parallel with a variable-capacitance capacitor whose capacitance varies depending on the stylus pressure value. When the stylus pressure value varies, the resonance frequency of the resonance circuit also varies, resulting in a change in the frequency of the stylus alternating magnetic field. Therefore, the sensor controller can detect the stylus pressure value by detecting the frequency of the alternating currents generated in the loop coils.

BRIEF SUMMARY

The resonance of the resonance circuit of the electromagnetic resonance stylus subsides with time after the sensor controller stops transmitting a feeder alternating magnetic field. If the sensor controller starts transmitting a next feeder alternating magnetic field before the resonance due to the previous feeder alternating magnetic field has sufficiently subsided, a stylus alternating magnetic field to be transmitted, after the next feeder alternating magnetic field transmission is stopped, from the electromagnetic resonance stylus is adversely affected by the residual resonance. As a result, the electromagnetic resonance stylus generates and transmits a stylus alternating magnetic field with wrong amplitude and frequency. When the amplitude of the stylus alternating magnetic field is wrong, the detection accuracy of the position and height of the electromagnetic resonance stylus is lowered, and so is the detection accuracy of the stylus pressure value. Because such lowering of the detection accuracy leads to imprecise or inaccurate drawing rendering on the input surface, it is customary for the sensor controller to wait until the resonance of the resonance circuit in the electromagnetic resonance stylus sufficiently subsides before starting to transmit the next feeder alternating magnetic field. However, increasing the intervals at which feeder alternating magnetic fields are transmitted means reducing the frequency with which to detect the position and the stylus pressure value of the electromagnetic resonance stylus, which also results in imprecise or inaccurate drawing rendering on the input surface.

One solution to the above problem would be to temporarily ground the resonance circuit of the electromagnetic resonance stylus during the intervals at which feeder alternating magnetic fields are transmitted from the sensor controller. The solution, however, poses another problem in that the electromagnetic resonance stylus has to incorporate an integrated circuit for controlling the timing of the grounding of the resonance circuit.

According to one aspect of the present disclosure, a method and a sensor controller are provided which make it possible to allow an electromagnetic resonance stylus to produce highly accurate drawing rendering, without having to ground the resonance circuit of the electromagnetic resonance stylus during the intervals at which feeder alternating magnetic fields are transmitted from the sensor controller.

In accordance with an aspect of the present disclosure, there is provided a method carried out by a sensor controller for detecting an electromagnetic resonance stylus using an electromagnetic resonance sensor. The method includes, upon elapse of a predetermined period after the electromagnetic resonance sensor has stopped transmitting a feeder alternating magnetic field for feeding electric power to the electromagnetic resonance stylus, transmitting, from the electromagnetic resonance sensor, a cancelling alternating magnetic field that oscillates in a phase that cancels residual resonance in the electromagnetic resonance stylus.

In accordance with an aspect of the present disclosure, there is provided a sensor controller for detecting an electromagnetic resonance stylus using an electromagnetic resonance sensor. The electromagnetic resonance sensor transmits a cancelling alternating magnetic field that oscillates in a phase that cancels residual resonance in the electromagnetic resonance stylus, upon elapse of a predetermined period after the electromagnetic resonance sensor has stopped transmitting a feeder alternating magnetic field for feeding electric power to the electromagnetic resonance stylus.

According to the present disclosure, since the cancelling alternating magnetic field transmitted from the electromagnetic resonance sensor forcibly suppresses residual resonance in the electromagnetic resonance stylus, it is possible for the electromagnetic resonance stylus to produce highly accurate drawing rendering without having to ground the resonance circuit of the electromagnetic resonance stylus during the intervals at which feeder alternating magnetic fields are transmitted from the sensor controller.

BRIEF DESCRIPTION OF THE SEVERAL VIEWS OF THE DRAWINGS

FIGS. 4A through 4F are diagrams illustrating the relation between the transmission phases of cancelling alternating magnetic fields or amplifying alternating magnetic fields and the waveforms of stylus alternating magnetic fields;

DETAILED DESCRIPTION

Embodiments of the present disclosure will be described in detail below with reference to the accompanying drawings.

Figure 1:
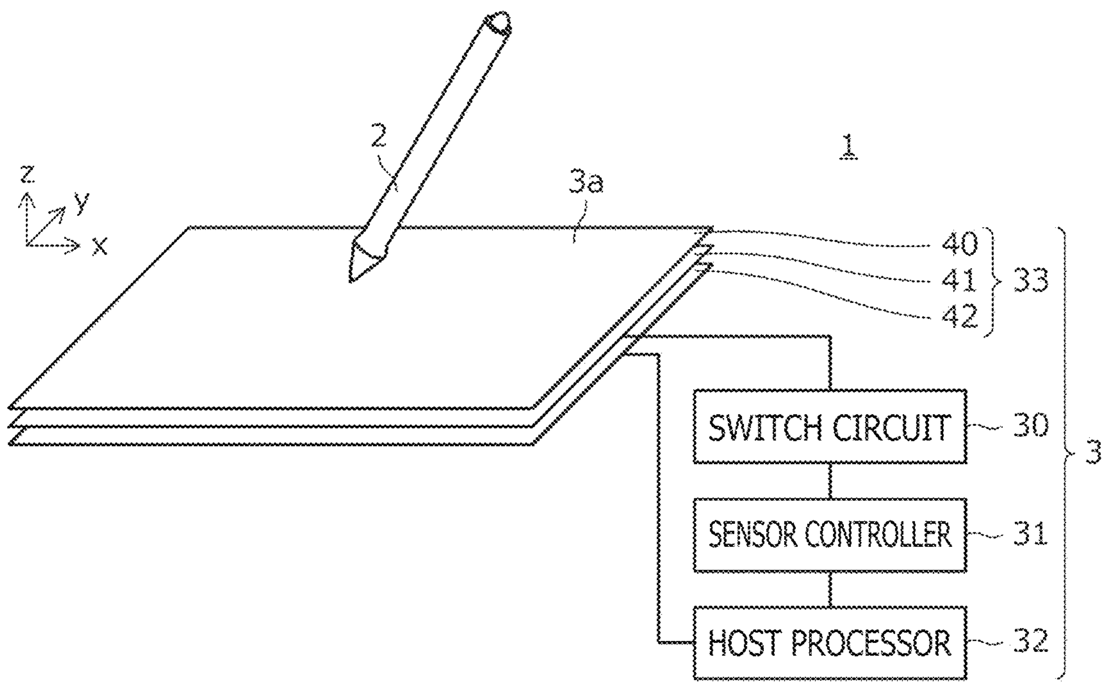
FIG. 1 is a perspective view, partly in block form, of a position detecting system according to an embodiment of the present disclosure.

FIG. 1 illustrates in perspective, partly in block form, a position detecting system 1 according to the present embodiment. As illustrated in FIG. 1, the position detecting system 1 includes an electromagnetic resonance stylus 2 and a position detecting unit 3. The electromagnetic resonance stylus 2 is a stylus which supports a position detection according to the EMR technology, and includes a resonance circuit including a coil and a capacitor.

The position detecting unit 3 includes a computer compatible with stylus inputs according to the EMR technology and touch inputs according to the capacitance principle. The position detecting unit 3 has a switch circuit 30, a sensor controller 31, a host processor 32, and a structural assembly 33. The structural assembly 33 includes a touch sensor 40, an EMR sensor 41, and a display 42. According to a typical example, the position detecting unit 3 includes a tablet or a laptop computer compatible with stylus inputs and touch inputs.

First, the structural assembly 33 will be described in detail below. The touch sensor 40 includes a plurality of linear Tx electrodes extending along the x-direction and arrayed along the y-direction and a plurality of linear Rx electrodes extending along the y-direction and arrayed along the x-direction. Each of the Tx electrodes and each of the Rx electrodes are connected via the switch circuit 30 to the sensor controller 31.

The EMR sensor 41 includes a plurality of Tx coils and a plurality of Rx coils. Each of the Tx coils and each of the Rx coils are also connected via the switch circuit 30 to the sensor controller 31.

The display 42 refers to a display device for displaying image signals supplied from the host processor 32. The display 42 may typically include a liquid display or an organic electroluminescence (EL) display, although it is not limited to any particular display types.

The structural assembly 33 has a surface covered with cover glass or a cover film, and functions as a panel face 3*a* doubling as touch faces of the touch sensor 40 and the EMR sensor 41 and a display face of the display 42. A user of the position detecting unit 3 performs a stylus input process by sliding the tip of the electromagnetic resonance stylus 2 on the panel face 3*a* and a touch input process by sliding the user's finger on the panel face 3*a*.

The switch circuit 30 includes an integrated circuit including a group of switches provided between the electrodes of the touch sensor 40 and the coils of the EMR sensor 41. The sensor controller 31 performs switching between the switches of the switch circuit 30.

The sensor controller 31 includes an integrated circuit having a function to derive the position of the user's finger on the panel face 3*a* using the touch sensor 40 and a function to derive the position of the electromagnetic resonance stylus 2 on the panel face 3*a* using the EMR sensor 41. The sensor controller 31 also has a function to receive data transmitted from the electromagnetic resonance stylus 2. The sensor controller 31 supplies the derived positions and received data sequentially to the host processor 32.

A processing operation carried out by the sensor controller 31 will briefly be described below. For detecting the position of the user's finger, the sensor controller 31 transmits touch detecting signals from the Tx electrodes, receives the touch detecting signals with the Rx electrodes, and acquires the intensities of the received touch detecting signals at the crossings of the Rx electrodes and the Tx electrodes. Then, the sensor controller 31 derives the position of the finger on the panel face 3*a* on the basis of the distribution of the acquired intensities.

For detecting the position of the electromagnetic resonance stylus 2, the sensor controller 31 supplies alternating currents successively to the Tx coils to transmit feeder alternating magnetic fields successively from the Tx coils. When the coil of the resonance circuit of the electromagnetic resonance stylus 2 enters one at a time of the feeder alternating magnetic fields, the coil generates an electromotive force across the coil and the capacitor of the resonance circuit of the electromagnetic resonance stylus 2 is charged. Then, the sensor controller 31 stops transmitting the feeder alternating magnetic fields, whereupon the electric power stored in the charged capacitor causes the coil of the electromagnetic resonance stylus 2 to transmit a stylus alternating magnetic field. The sensor controller 31 receives an alternating current (hereinafter referred to as a "stylus signal") generated in the corresponding Rx coil by the stylus alternating magnetic field. The sensor controller 31 acquires the intensity of the received stylus signal to derive the position of the electromagnetic resonance stylus 2 on the panel face 3*a*.

The sensor controller 31 derives the position of the electromagnetic resonance stylus 2 selectively in two scan modes, i.e., a global scan mode and a sector scan mode. The global scan mode refers to a process of detecting the position of the electromagnetic resonance stylus 2 on the entire panel face 3*a*, and is carried out when the electromagnetic resonance stylus 2 has not been detected yet. The sector scan mode refers to a process of updating the position of the electromagnetic resonance stylus 2 that has already been detected. In the sector scan mode, the sensor controller 31 detects the position of the electromagnetic resonance stylus 2 only in an area near the latest position of the electromagnetic resonance stylus 2 on the panel face 3*a*.

In the global scan mode, the sensor controller 31 supplies alternating currents successively to the respective Tx coils of the EMR sensor 41 and receives stylus signals via the respective Rx coils of the EMR sensor 41. The sensor controller 31 then derives a distribution of reception intensities on the panel face 3*a* from the reception intensities of the stylus signals from respective combinations of the Tx coils and the Rx coils, and derives the position of a peak of the distribution as the position of the electromagnetic resonance stylus 2. In the sector scan mode, the sensor controller 31 supplies alternating currents successively to a predetermined number of Tx coils in the vicinity of the latest position of the electromagnetic resonance stylus 2 and receives stylus signals via a predetermined number of Rx coils in the vicinity of the latest position of the electromagnetic resonance stylus 2. The sensor controller 31 then derives a distribution of reception intensities on the panel face 3*a* from the reception intensities of the stylus signals from respective combinations of the Tx coils and the Rx coils, and updates the position of the electromagnetic resonance stylus 2 on the basis of the position of a peak of the distribution.

Data transmitted from the electromagnetic resonance stylus 2 may represent a stylus pressure value indicative of the pressure applied to the tip of the electromagnetic resonance stylus 2, on/off information indicative of the state of a switch mounted on the surface of a casing of the electromagnetic resonance stylus 2, and a stylus identification (ID) stored in a memory in the electromagnetic resonance stylus 2. The electromagnetic resonance stylus 2 according to the present embodiment is configured to change the resonant frequency of the resonance circuit depending on the content of the data. When the resonant frequency of the resonance circuit varies, the frequency of the stylus signals received by the sensor controller 31 also varies. The sensor controller 31 detects the varying frequency by demodulating the received stylus signals, thereby receiving the data transmitted from the electromagnetic resonance stylus 2. The reception of the data will be described in greater detail later.

The host processor 32 functions as a central processor of the position detecting unit 3 and executes various applications including an operation system of the position detecting unit 3 by executing programs read from a memory (not shown). Processes performed by the host processor 32 according to the programs include a process of generating image signals and supplying them to the display 42 and various processes using positions and data supplied from the sensor controller 31. The various processes using positions and data include, for example, a process of moving a cursor displayed on the display face of the display 42 and a process of generating stroke data indicative of a path followed by the electromagnetic resonance stylus 2 on the touch face. The host processor 32 also performs various processes with respect to the stroke data, e.g., a process of rendering and displaying the generated stoke data, a process of generating and recording digital ink including the generated stroke data, and a process of transmitting the generated digital ink to an external device in response to user's instructions.

Figure 2A:
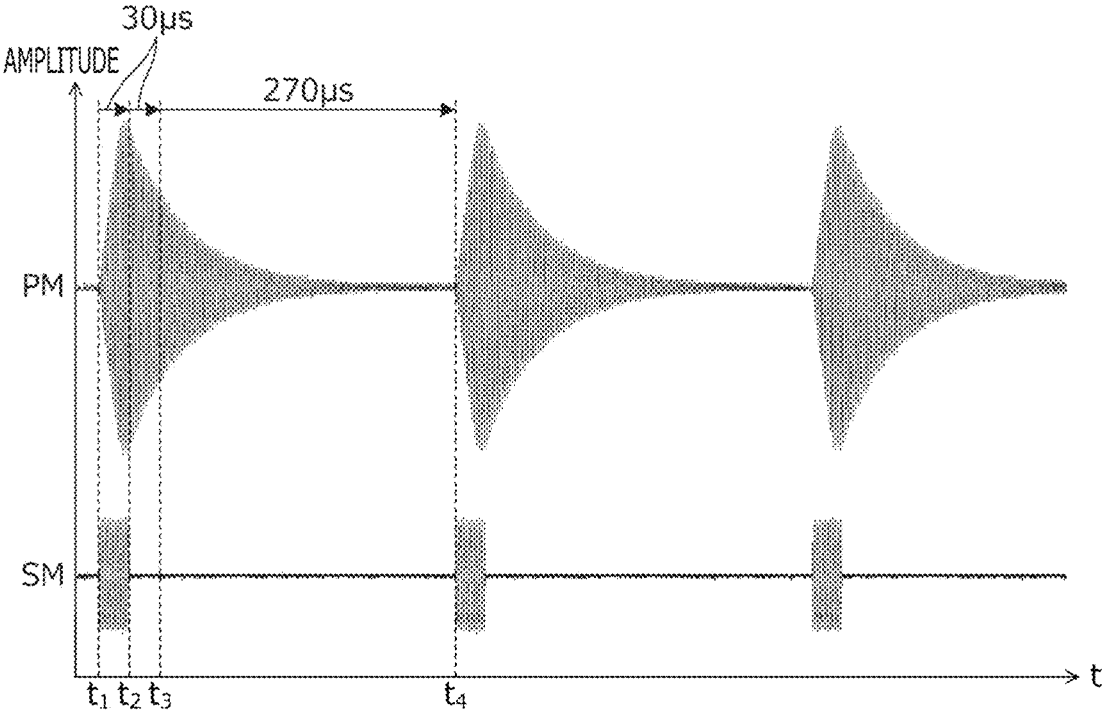
FIGS. 2A and 2B are diagrams illustrating the waveforms of alternating magnetic fields according to the background art of the present disclosure.
Figure 2B:
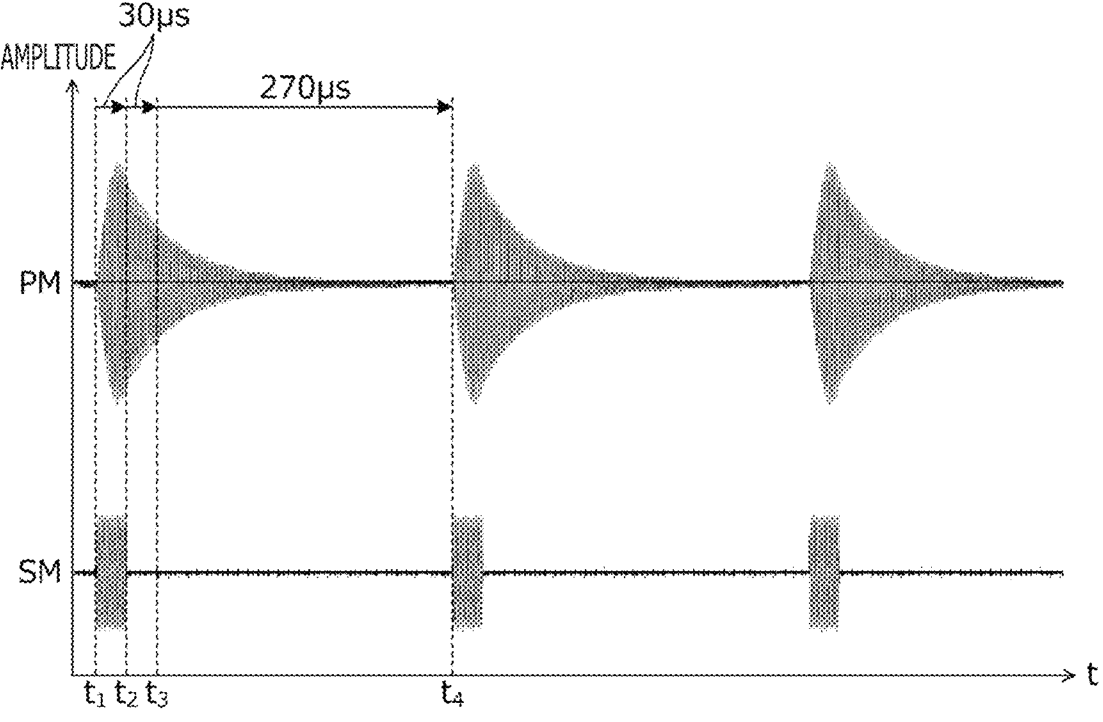

FIGS. 2A and 2B illustrate the waveforms of alternating magnetic fields according to the background art of the present disclosure. FIG. 2A illustrates the waveform in a case where the stylus pressure value is 0 g, and FIG. 2B illustrates the waveform in a case where the stylus pressure value is 500 g. In FIGS. 2A and 2B and also FIGS. 3, 4A through 4F, "SM" refers to a feeder alternating magnetic field, and "PM" refers to a stylus alternating magnetic field.

In FIGS. 2A and 2B, the sensor controller 31 starts transmitting a feeder alternating magnetic field SM at time $t_1$ and stops transmitting the feeder alternating magnetic field SM 30 microseconds later at time $t_2$. While the sensor controller 31 is transmitting the feeder alternating magnetic field SM during the period from time $t_1$ to time $t_2$, the amplitude of the stylus alternating magnetic field PM progressively increases. The amplitude of the stylus alternating magnetic field PM progressively increases because the capacitor of the resonance circuit of the electromagnetic resonance stylus 2 is progressively charged by an electromotive force, which is generated across the coil of the resonance circuit of the electromagnetic resonance stylus 2 by the feeder alternating magnetic field SM.

Even when the sensor controller 31 stops transmitting the feeder alternating magnetic field SM at time $t_2$, the stylus alternating magnetic field PM is not immediately eliminated, but has its amplitude gradually reduced. This is because the capacitor of the resonance circuit of the electromagnetic resonance stylus 2 is gradually discharged. The sensor controller 31 receives the stylus signal from time $t_2$, at which point of time it stops transmitting the feeder alternating magnetic field SM, until time $t_3$, which is 30 microseconds later, to derive the position of the electromagnetic resonance stylus 2 and to receive data transmitted from the electromagnetic resonance stylus 2.

The reception of the data transmitted from the electromagnetic resonance stylus 2 will be described in greater detail below. As described above, the electromagnetic resonance stylus 2 according to the present embodiment is configured to change the resonant frequency of the resonance circuit depending on the content of the data. Since a change in the resonant frequency of the resonance circuit means a change in the frequency of the stylus alternating magnetic field PM, the sensor controller 31 can demodulate the data transmitted from the electromagnetic resonance stylus 2 by detecting the frequency of the stylus alternating magnetic field PM. In an actual application, the sensor controller 31 uses a technique known as "delta phase (A phase)" technique to detect a change in the frequency of the stylus alternating magnetic field PM using a simple arrangement.

According to the delta phase technique, the sensor controller 31 determines the phase of the stylus alternating magnetic field PM on the basis of the amplitude of the stylus signal after elapse of a predetermined period from time $t_2$, at which it stops transmitting the feeder alternating magnetic field SM, for example at time $t_3$, and acquires the data transmitted from the electromagnetic resonance stylus 2 according to the determined phase. If the stylus alternating magnetic field PM and the feeder alternating magnetic field SM are in phase with each other at the time when the sensor controller 31 stops transmitting the feeder alternating magnetic field SM, then the phase of the stylus alternating magnetic field PM at time $t_3$ is of a value uniquely defined by the frequency of the stylus alternating magnetic field PM. Therefore, the sensor controller 31 that uses the delta phase technique can acquire the data transmitted from the electromagnetic resonance stylus 2 based on the defined phase of the stylus alternating magnetic field PM. Specifically, the sensor controller 31 may acquire the data transmitted from the electromagnetic resonance stylus 2 by storing a table representing an association between phases and data, and referring to the table based on the determined phase of the stylus alternating magnetic field PM. However, if the stylus alternating magnetic field PM and the feeder alternating magnetic field SM are out of phase with each other due to residual resonance in the electromagnetic resonance stylus 2, then the data acquired in the manner described above may not necessarily be correct data. To overcome the difficulty, according to the background art, the sensor controller 31 waits until the resonance of the resonance circuit of the electromagnetic resonance stylus 2 has sufficiently subsided before starting to transmit a next feeder alternating magnetic field SM.

As illustrated in FIGS. 2A and 2B, it has been customary for the sensor controller 31 in the art to start transmitting a next feeder alternating magnetic field SM at time $t_4$, which is later than $t_3$ by a waiting period of 270 microseconds. The waiting period of 270 microseconds is required for the resonance of the resonance circuit of the electromagnetic resonance stylus 2 to be sufficiently suppressed. However, the waiting period of 270 microseconds tends to increase the intervals at which feeder alternating magnetic fields SM are transmitted, resulting in a reduction in the frequency with which the position and the stylus pressure value of the electromagnetic resonance stylus 2 are detected. In order to eliminate the above shortcoming, the sensor controller 31 according to the present embodiment performs a process of forcibly removing the residual resonance in the electromagnetic resonance stylus 2 by transmitting a cancelling alternating magnetic field having a phase for cancelling the residual resonance in the electromagnetic resonance stylus 2, prior to the transmission of a next feeder alternating magnetic field SM. Details of the process will be described below.

Figure 3:
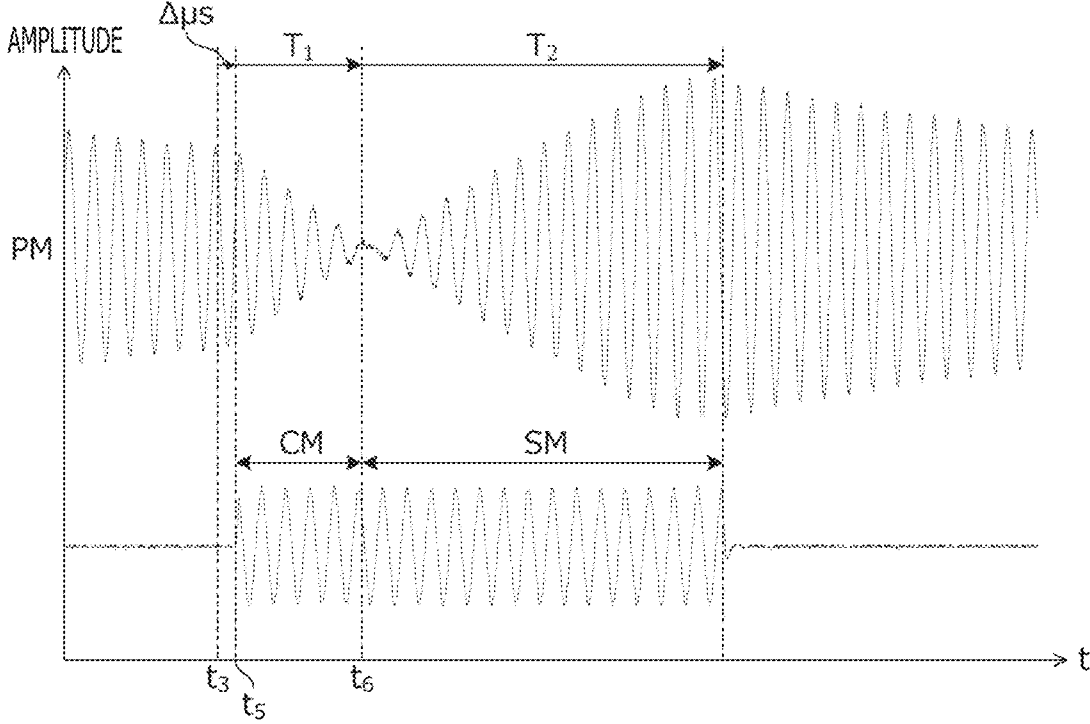
FIG. 3 is a diagram illustrating by way of example the waveforms of alternating magnetic fields according to the present embodiment.

FIG. 3 illustrates by way of example the waveforms of alternating magnetic fields according to the present embodiment. The sensor controller 31 according to the present embodiment does not wait for 270 microseconds before it transmits a next feeder alternating magnetic field SM as illustrated in FIGS. 2A and 2B, but instead transmits an alternating magnetic field that oscillates in a phase that cancels the residual resonance in the electromagnetic resonance stylus 2 for a predetermined period $T_1$, prior to the transmission of a next feeder alternating magnetic field SM. The alternating magnetic field transmitted for the predetermined period $T_1$ will hereinafter be referred to as a "cancelling alternating magnetic field CM." After having transmitted the cancelling alternating magnetic field CM, the sensor controller 31 transmits the next feeder alternating magnetic field SM for a predetermined period $T_2$.

The sensor controller 31 may transmit the cancelling alternating magnetic field CM and then the next feeder alternating magnetic field SM in succession. Alternatively, the sensor controller 31 may transmit the cancelling alternating magnetic field CM, then stop transmitting the cancelling alternating magnetic field CM, and thereafter transmit the next feeder alternating magnetic field SM. In the former case, the feeder alternating magnetic field SM may be in phase with the cancelling alternating magnetic field CM. FIG. 3 illustrates an example of the former case. The predetermined periods $T_1$ and $T_2$ may be of fixed values. For example, $T_1$ may be 7.5 microseconds, and $T_2$ may be 22.5 microseconds. $T_2$ may alternatively be 30 microseconds, making it possible to feed electric power to the electromagnetic resonance stylus 2 for the same period as with the example illustrated in FIGS. 2A and 2B.

The timing of the starting of the transmission of the cancelling alternating magnetic field CM will be described below. In principle, the sensor controller 31 starts to transmit the cancelling alternating magnetic field CM at time $t_3$ (also depicted in FIGS. 2A and 2B) that is a predetermined period (30 microseconds) later than the time when it has stopped transmitting the feeder alternating magnetic field SM. However, the sensor controller 31 performs a delaying process of delaying the exact timing of the starting of the transmission of the cancelling alternating magnetic field CM for Δ microseconds (Δ represents a value smaller than one cyclic period of the cancelling alternating magnetic field CM and the feeder alternating magnetic field SM) from time $t_3$. The sensor controller 31 controls the phase of the cancelling alternating magnetic field CM by performing the delaying process.

A specific value of Δ is determined as follows. Each time the sensor controller 31 receives a stylus signal, the sensor controller 31 acquires the phase (reception phase) of the received stylus signal based on the phase (transmission phase) of the preceding feeder alternating magnetic field SM that it has transmitted. The sensor controller 31 then determines the phase of a cancelling alternating magnetic field CM based on the acquired reception phase and determines a value of Δ in order to transmit a cancelling alternating magnetic field CM in the determined phase. Specifically, the sensor controller 31 may determine a value of Δ according to the equation $\Delta=(\theta/2\pi)\times T$ where θ represents the determined phase and T represents the period of the cancelling alternating magnetic field CM (=the period of the feeder alternating magnetic field SM). In this fashion, it is possible to cancel the residual resonance in the electromagnetic resonance stylus 2 with the cancelling alternating magnetic field CM.

FIG. 3 illustrates the manner in which the residual resonance in the electromagnetic resonance stylus 2 is cancelled by the cancelling alternating magnetic field CM that has been transmitted with the delay Δ microseconds from time $t_3$. As illustrated in FIG. 3, the sensor controller 31 starts to transmit the cancelling alternating magnetic field CM at time $t_5$ after elapse of A microseconds from time $t_3$. At the same time that the cancelling alternating magnetic field CM starts to be transmitted, the amplitude of the stylus alternating magnetic field PM is increasingly reduced, and the amplitude of the stylus alternating magnetic field PM becomes temporarily zero at time $t_6$ when the transmission of cancelling alternating magnetic field CM is finished. In the example illustrated in FIG. 3, since the sensor controller 31 transmits the cancelling alternating magnetic field CM and then the next feeder alternating magnetic field SM in succession, the amplitude of the stylus alternating magnetic field PM is increased again after time $t_6$. As the amplitude of the stylus alternating magnetic field PM is temporarily reduced to zero at time $t_6$, the increasing stylus alternating magnetic field PM is free of any adverse effects of residual resonance in the electromagnetic resonance stylus 2. In the example illustrated in FIG. 3, consequently, the accuracy with which to detect the position and the stylus pressure value of the electromagnetic resonance stylus 2 is prevented from being lowered by residual resonance in the electromagnetic resonance stylus 2.

Although the example in which the stylus alternating magnetic field PM is suppressed by the transmission of the cancelling alternating magnetic field CM has been described with reference to FIG. 3, the sensor controller 31 may transmit an alternating magnetic field for increasing the amplitude of the stylus alternating magnetic field PM, rather than transmitting the cancelling alternating magnetic field CM. The alternating magnetic field for increasing the amplitude of the stylus alternating magnetic field PM will be referred to as an "amplifying alternating magnetic field AM." Forcibly increasing the amplitude of the stylus alternating magnetic field PM with the amplifying alternating magnetic field AM is an effective feeding process for reliably feeding electric power to the electromagnetic resonance stylus 2 that is spaced from the panel face 3*a*. For example, the feeding process can be carried out when the electromagnetic resonance stylus 2 is hovering above the panel face 3*a*, i.e., when the tip of the electromagnetic resonance stylus 2 is in the air above the panel face 3*a* and the electromagnetic resonance stylus 2 is not producing drawing rendering.

FIGS. 4A through 4F illustrate the relation between the transmission phases of cancelling alternating magnetic fields CM or amplifying alternating magnetic fields AM and the waveforms of stylus alternating magnetic fields PM. FIGS. 4A through 4C illustrate three examples in which the stylus pressure value is 0 g and the transmission phases of the cancelling alternating magnetic fields CM or the amplifying alternating magnetic fields AM are set to 0°, 264°, and 96°, respectively, and FIGS. 4D through 4F illustrate three examples in which the stylus pressure value is 500 g and the transmission phases of the cancelling alternating magnetic fields CM or the amplifying alternating magnetic fields AM are set to 0°, 48°, and 288°, respectively. It can be understood from these examples that though the values of the transmission phases of the cancelling alternating magnetic fields CM or the amplifying alternating magnetic fields AM are different depending on the stylus pressure value (data transmitted from the electromagnetic resonance stylus 2), the amplitudes of the stylus alternating magnetic fields PM can forcibly be suppressed and forcibly be increased by setting the transmission phase to appropriate values regardless of whether the stylus pressure value is 0 g or 500 g.

Figure 5:
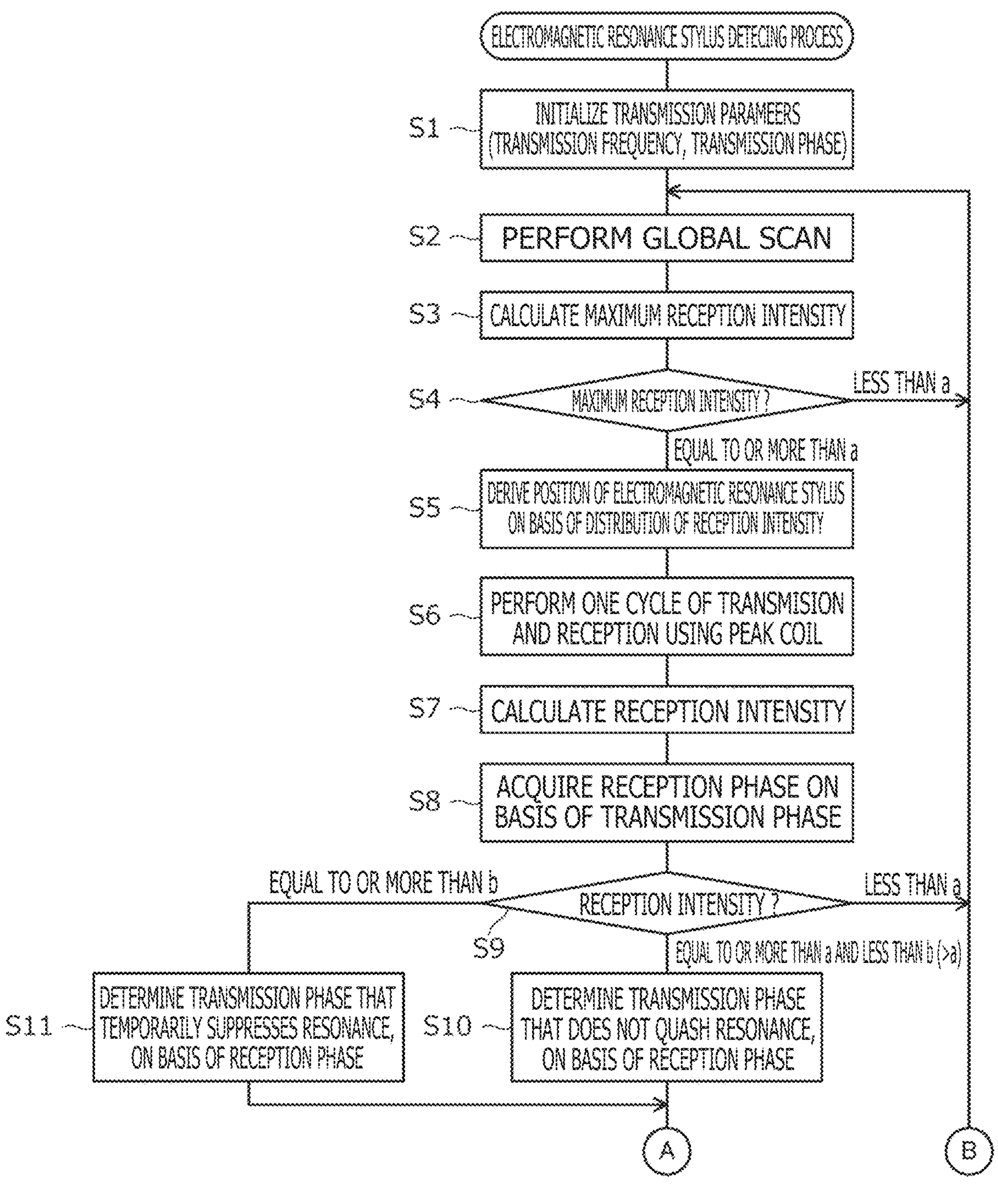
FIG. 5 is a flowchart of a part of the processing sequence of an electromagnetic resonance stylus detecting process carried out by a sensor controller.
Figure 6:
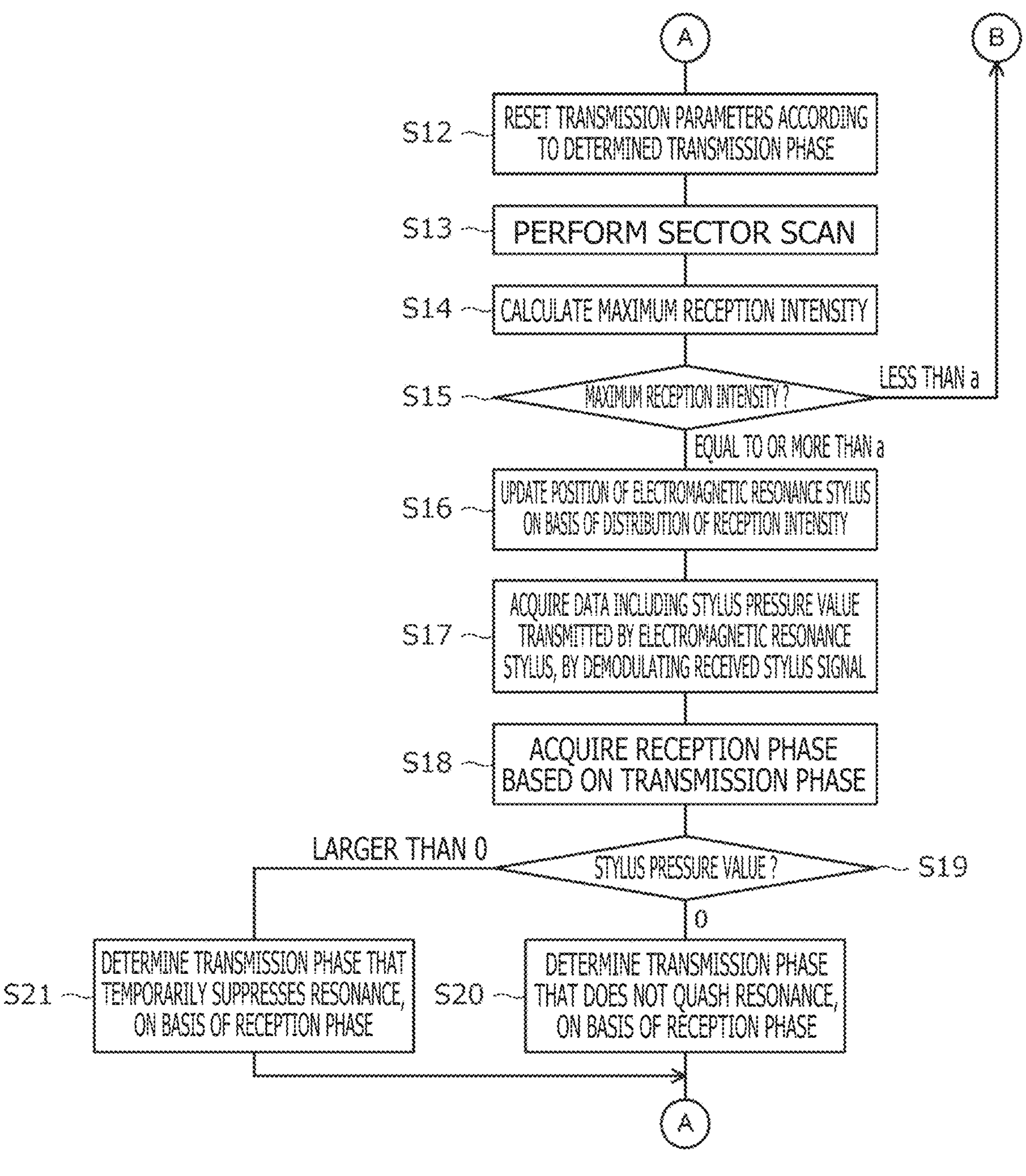
FIG. 6 is a flowchart of a remaining part of the processing sequence of the electromagnetic resonance stylus detecting process carried out by the sensor controller.

FIGS. 5 and 6 are flowcharts of the processing sequence of an electromagnetic resonance stylus detecting process carried out by the sensor controller 31. The process carried out by the sensor controller 31 for forcibly suppressing or forcibly increasing a stylus alternating magnetic field PM will be described in specific detail below with reference to FIGS. 5 and 6. In the description that follows, the feeder alternating magnetic field SM, the cancelling alternating magnetic field CM, and the amplifying alternating magnetic field AM may collectively be referred to as a "transmission alternating magnetic field."

First, as illustrated in FIG. 5, the sensor controller 31 initializes various transmission parameters of a transmission alternating magnetic field that include a transmission frequency and a transmission phase (step S1). Then, the sensor controller 31 performs the global scan mode described above (step S2). In the global scan mode, the sensor controller 31 transmits only a feeder alternating magnetic field SM and does not transmit a cancelling alternating magnetic field CM and an amplifying alternating magnetic field AM.

After having completed the global scan mode, the sensor controller 31 calculates a maximum reception intensity of a stylus signal (step S3) and then determines whether or not the calculated maximum reception intensity is equal to or more than a predetermined value "a" (step S4). The predetermined value "a" represents a threshold value used as a criterion for determining whether the sensor controller 31 has received a stylus signal or not from the electromagnetic resonance stylus 2. If the sensor controller 31 determines that the maximum reception intensity is less than the predetermined value "a" in step S4, then the sensor controller 31 decides that it has not detected the electromagnetic resonance stylus 2, and the processing sequence goes back to step S2.

If the sensor controller 31 determines that the maximum reception intensity is equal to or more than the predetermined value "a" in step S4, then the sensor controller 31 derives a distribution of reception intensities on the panel face 3*a* based on the reception intensities of the stylus signals from respective combinations of the Tx coils and the Rx coils, and derives the position of a peak of the distribution as the position of the electromagnetic resonance stylus 2 (step S5). The sensor controller 31 supplies the derived position to the host processor 32.

Thereafter, the sensor controller 31 performs the transmission of a feeder alternating magnetic field SM and the reception of a stylus signal once using the combination of the Tx coil and the Rx coil (peak coils) where the maximum reception intensity has been observed (step S6). Then, the sensor controller 31 calculates the reception intensity of a stylus signal (step S7) and acquires the reception phase of the stylus signal on the basis of the transmission phase of the feeder alternating magnetic field SM (step S8).

Then, the sensor controller 31 determines whether the reception intensity calculated in step S7 is either equal to or more than a predetermined value "b," equal to or more than the predetermined value "a" and less than the predetermined value "b," or less than the predetermined value "a" (step S9). The predetermined value "a" is the same as the predetermined value "a" described in step S4, and the predetermined value "b" represents a threshold value used as a criterion for determining whether the electromagnetic resonance stylus 2 is in contact with the panel face 3*a* or not. If the sensor controller 31 decides that the reception intensity is less than the predetermined value "a" in step S9, then the sensor controller 31 decides that it has not detected the electromagnetic resonance stylus 2, and the processing sequence goes back to step S2.

If the sensor controller 31 decides that the reception intensity is equal to or more than the predetermined value "a" and less than the predetermined value "b" in step S9, then the sensor controller 31 decides that the electromagnetic resonance stylus 2 is not in contact with the panel face 3*a*, and determines, based on the reception phase acquired in step S8, a transmission phase that does not quash the resonance in the electromagnetic resonance stylus 2 (step S10). When the sensor controller 31 transmits an amplifying alternating magnetic field AM in the transmission phase thus determined, the amplitude of the stylus alternating magnetic field PM can forcibly be increased as illustrated in FIGS. 4A, 4C, and 4F. Therefore, the sensor controller 31 can properly receive a stylus signal even though the electromagnetic resonance stylus 2 is not sufficiently close to the panel face 3*a* and hence the amplitude of the stylus signal is not stable.

If the sensor controller 31 decides that the reception intensity is equal to or more than the predetermined value "b" in step S9, then the sensor controller 31 decides that the electromagnetic resonance stylus 2 is in contact with the panel face 3*a*, and determines a transmission phase that temporarily suppresses the resonance in the electromagnetic resonance stylus 2 based on the reception phase acquired in step S8 (step S11). When the sensor controller 31 transmits a cancelling alternating magnetic field CM in the transmission phase thus determined, the amplitude of the stylus alternating magnetic field PM is forcibly suppressed as illustrated in FIGS. 4B, 4D, and 4E. Therefore, it is possible to reduce the possibility that the sensor controller 31 may acquire wrong data due to residual resonance in the electromagnetic resonance stylus 2.

After step S10 or step S11, the sensor controller 31 resets transmission parameters according to the transmission phase determined in step S10 or step S11 (step S12) as illustrated in FIG. 6. Thereafter, the sensor controller 31 performs the sector scan mode described above (step S13). In the sector scan mode, the sensor controller 31 repeats a process of: transmitting a feeder alternating magnetic field SM from a Tx coil for $T_2$ microseconds, waiting for a predetermined period+Δ microseconds (e.g., 30 microseconds) after stopping the transmission of the feeder alternating magnetic field SM, and transmitting a next cancelling alternating magnetic field CM or a next amplifying alternating magnetic field AM for $T_1$ microseconds. Δ refers to a value determined according to the transmission phase determined in step S10 or S11. It is thus possible to temporarily suppress or increase the amplitude of the stylus alternating magnetic field PM each time the feeder alternating magnetic field SM is transmitted.

After the sector scan mode, the sensor controller 31 calculates a maximum reception intensity of a stylus signal (step S14) and then determines whether or not the calculated maximum reception intensity is equal to or more than a predetermined value "a" (step S15). The predetermined value "a" is the same as the predetermined value "a" used in step S4. If the sensor controller 31 determines that the maximum reception intensity is less than the predetermined value "a" in step S15, then the sensor controller 31 decides that it has not detected the electromagnetic resonance stylus 2, and the processing sequence goes back to step S2.

If the sensor controller 31 determines that the maximum reception intensity is equal to or more than the predetermined value "a" in step S15, then the sensor controller 31 derives a distribution of reception intensities on the panel face 3*a* based on the reception intensities of the stylus signals from respective combinations of the Tx coils and the Rx coils, and updates the position of the electromagnetic resonance stylus 2 on the basis of the position of a peak of the distribution (step S16). Then, the sensor controller 31 demodulates the received stylus signal to acquire data including a stylus pressure value transmitted from the electromagnetic resonance stylus 2 (step S17). The sensor controller 31 supplies the updated position and the acquired data to the host processor 32.

Thereafter, the sensor controller 31 acquires the reception phase of the stylus signal on the basis of the transmission phase of the feeder alternating magnetic field SM (step S18). The transmission phase and the reception phase referred to at this time may be those when the maximum reception intensity of the stylus signal has been observed. Then, the sensor controller 31 determines whether the stylus pressure value acquired in step S17 is larger than 0 or not, i.e., whether the electromagnetic resonance stylus 2 is in contact with the panel face 3*a* or not (step S19). If the sensor controller 31 decides that the stylus pressure value is 0 in step S19, then the sensor controller 31 determines a transmission phase that does not quash the resonance in the electromagnetic resonance stylus 2 based on the reception phase acquired in step S18 (step S20). As with step S10 illustrated in FIG. 5, when the sensor controller 31 transmits an amplifying alternating magnetic field AM in the transmission phase thus determined prior to the transmission of a feeder alternating magnetic field SM, the amplitude of the stylus alternating magnetic field PM can be forcibly increased. Therefore, the sensor controller 31 can properly receive a stylus signal from the electromagnetic resonance stylus 2 while the electromagnetic resonance stylus 2 is hovering above the panel face 3*a*.

If the sensor controller 31 decides that the stylus pressure value is larger than 0 in step S19, then the sensor controller 31 determines a transmission phase that temporarily suppresses the resonance in the electromagnetic resonance stylus 2 on the basis of the reception phase acquired in step S18 (step S21). As with step S11 illustrated in FIG. 5, when the sensor controller 31 transmits a cancelling alternating magnetic field CM in the transmission phase thus determined prior to the transmission of a feeder alternating magnetic field SM, the amplitude of the stylus alternating magnetic field PM can be forcibly suppressed. Therefore, it is possible to reduce the possibility that the sensor controller 31 may acquire wrong data due to residual resonance in the electromagnetic resonance stylus 2.

After step S20 or step S21, the processing sequence goes back to step S12, so that the sensor controller 31 continues to perform the processing from step S12. Consequently, each time the sector scan mode is carried out, it is possible to effectively use an amplifying alternating magnetic field AM and a cancelling alternating magnetic field CM.

As described above, the sensor controller 31 according to the present embodiment can forcibly suppress the residual resonance in the electromagnetic resonance stylus 2 with the cancelling alternating magnetic field CM transmitted from the EMR sensor 41. Therefore, even though the resonance circuit of the electromagnetic resonance stylus 2 is not grounded during the intervals in which the sensor controller 31 transmits alternating magnetic fields, the electromagnetic resonance stylus 2 can produce drawing rendering on the panel face 3*a* with high accuracy.

In a case where the tip of the electromagnetic resonance stylus 2 is not in contact with the panel face 3*a* and hence the electromagnetic resonance stylus 2 is not producing drawing rendering on the panel face 3*a*, the amplitude of the electromagnetic resonance stylus 2 can forcibly be increased by the amplifying alternating magnetic field AM transmitted from the EMR sensor 41. Therefore, the sensor controller 31 can properly receive a stylus signal from the electromagnetic resonance stylus 2 while the electromagnetic resonance stylus 2 is hovering above the panel face 3*a*.

Although the preferred embodiments of the present disclosure have been described in detail above, the present disclosure is not limited to the embodiments. Various changes and modifications may be made without departing from the scope of the disclosure.

For example, according to the above embodiments, each time the sensor controller 31 receives a stylus signal, the sensor controller 31 acquires the reception phase of the stylus signal on the basis of the transmission phase of the preceding feeder alternating magnetic field SM transmitted from the sensor controller 31, and determines respective transmission phases of an amplifying alternating magnetic field AM and a cancelling alternating magnetic field CM on the basis of the acquired reception phase. However, if an electromagnetic resonance stylus 2 is of the type whose resonant frequency is not variable, then the respective transmission phases of an amplifying alternating magnetic field AM and a cancelling alternating magnetic field CM may be of fixed values. The fixed transmission phases are effective to reduce the processing load of the sensor controller 31. However, the electromagnetic resonance stylus 2 of this type may have its resonant frequency varied when it is positioned at an edge of the panel face 3*a* or depending on the distance (height) from the panel face 3*a*. Accordingly, the sensor controller 31 may determine respective transmission phases of an amplifying alternating magnetic field AM and a cancelling alternating magnetic field CM on the basis of a stylus signal received from the electromagnetic resonance stylus 2 of this type. Specifically, the sensor controller 31 may determine respective transmission phases of an amplifying alternating magnetic field AM and a cancelling alternating magnetic field CM on the basis of the detected position of the electromagnetic resonance stylus 2 or the maximum value of the reception intensity of a stylus signal that tends to vary depending on the distance from the panel face 3*a*.

The invention claimed is:

1. A method carried out by a sensor controller for detecting an electromagnetic resonance stylus using an electromagnetic resonance sensor, the method comprising:

upon elapse of a predetermined period after the electromagnetic resonance sensor has stopped transmitting a feeder alternating magnetic field for feeding electric power to the electromagnetic resonance stylus, transmitting, from the electromagnetic resonance sensor, a cancelling alternating magnetic field that oscillates in a phase that cancels residual resonance of the electromagnetic resonance stylus, wherein, after the electromagnetic resonance sensor has transmitted the cancelling alternating magnetic field, the electromagnetic resonance sensor transmits the feeder alternating magnetic field again, and wherein the electromagnetic resonance sensor transmits the cancelling alternating magnetic field and then the feeder alternating magnetic field in succession.

2. The method according to claim 1, wherein the sensor controller receives, within the predetermined period, a stylus signal generated in the electromagnetic resonance sensor by an alternating magnetic field transmitted from the electromagnetic resonance stylus.

3. The method according to claim 1, wherein, after the electromagnetic resonance sensor has transmitted the cancelling alternating magnetic field, the electromagnetic resonance sensor stops receiving an alternating magnetic field and thereafter transmits the feeder alternating magnetic field.

4. The method according to claim 1, wherein the phase that cancels residual resonance of the electromagnetic resonance stylus is of a fixed value.

5. The method according to claim 1, wherein the phase that cancels residual resonance of the electromagnetic resonance stylus is of a value determined on a basis of a stylus signal received from the electromagnetic resonance stylus.

6. The method according to claim 5, wherein the phase that cancels residual resonance of the electromagnetic resonance stylus is of a value determined on a basis of a position or a height of the electromagnetic resonance stylus that is detected using the stylus signal received from the electromagnetic resonance stylus.

7. The method according to claim 5, wherein the phase that cancels residual resonance of the electromagnetic resonance stylus is of a value determined on a basis of a phase of the stylus signal received from the electromagnetic resonance stylus.

8. The method according to claim 1, wherein the sensor controller transmits the cancelling alternating magnetic field by starting to transmit the cancelling alternating magnetic field at a time delayed by a period corresponding to the phase that cancels residual resonance of the electromagnetic resonance stylus from a time upon elapse of the predetermined period after the electromagnetic resonance sensor has stopped transmitting the feeder alternating magnetic field.

9. The method according to claim 8, wherein the period corresponding to the phase that cancels residual resonance in the electromagnetic resonance stylus is smaller than one cyclic period of the cancelling alternating magnetic field.

10. The method according to claim 1, wherein the sensor controller transmits, upon elapse of the predetermined period after the electromagnetic resonance sensor has stopped transmitting the feeder alternating magnetic field, from the electromagnetic resonance sensor, either the cancelling alternating magnetic field or an amplifying alternating magnetic field that oscillates in a phase for increasing an amplitude of an alternating magnetic field transmitted from the electromagnetic resonance stylus.

11. The method according to claim 10, wherein the sensor controller determines whether the electromagnetic resonance stylus is in contract with a panel face or not, and if the sensor controller decides that the electromagnetic resonance stylus is in contact with the panel face, the sensor controller transmits the cancelling alternating magnetic field, and if the sensor controller decides that the electromagnetic resonance stylus is not in contact with the panel face, the sensor controller transmits the amplifying alternating magnetic field.

12. The method according to claim 11, wherein the sensor controller determines whether the electromagnetic resonance stylus is in contract with the panel face or not on a basis of a stylus pressure value received from the electromagnetic resonance stylus.

13. The method according to claim 11, wherein the sensor controller determines whether the electromagnetic resonance stylus is in contract with the panel face or not on a basis of a maximum reception intensity of a stylus signal received from the electromagnetic resonance stylus.

14. The method according to claim 1, wherein the sensor controller does not transmit the cancelling alternating magnetic field when it is not detecting the electromagnetic resonance stylus.

15. A sensor controller for detecting an electromagnetic resonance stylus using an electromagnetic resonance sensor, wherein the electromagnetic resonance sensor, upon elapse of a predetermined period after the electromagnetic resonance sensor has stopped transmitting a feeder alternating magnetic field for feeding electric power to the electromagnetic resonance stylus, transmits a cancelling alternating magnetic field that oscillates in a phase that cancels residual resonance in the electromagnetic resonance stylus, wherein, after the electromagnetic resonance sensor has transmitted the cancelling alternating magnetic field, the electromagnetic resonance sensor transmits the feeder alternating magnetic field again, and wherein the electromagnetic resonance sensor transmits the cancelling alternating magnetic field and then the feeder alternating magnetic field in succession.

* * * * *